United States Patent [19]
Hasz et al.

[11] Patent Number: 5,929,837
[45] Date of Patent: Jul. 27, 1999

[54] METHOD AND APPARATUS FOR DETERMINING REPRESENTATIVE CHROMINANCE COMPONENTS

[75] Inventors: Vernon Dennis Hasz, Bellvue; Karl Scott Mills, Lynnwood; Richard Charles Andrew Owen; Mark Emil Bonnelycke, both of Seattle, all of Wash.

[73] Assignee: Cirrus Logic, Inc., Fremont, Calif.

[21] Appl. No.: 09/107,579

[22] Filed: Mar. 2, 1998

Related U.S. Application Data

[63] Continuation of application No. 08/550,794, Oct. 31, 1995, abandoned.

[51] Int. Cl.$^6$ .............................. G09G 5/00; G09G 5/36; G09G 5/04
[52] U.S. Cl. .......................... 345/127; 345/131; 345/133; 345/154; 345/155
[58] Field of Search ..................................... 345/127, 131, 345/133, 154, 155, 186, 199, 200; 348/386, 388, 396, 659, 660, 661

[56] References Cited

U.S. PATENT DOCUMENTS

| | | |
|---|---|---|
| 4,315,278 | 2/1982 | Pasdera . |
| 4,491,861 | 1/1985 | Sochov ...................................... 358/13 |
| 4,707,729 | 11/1987 | Bruno et al. . |
| 4,752,983 | 6/1988 | Guttag et al. ............................ 345/155 |
| 5,003,299 | 3/1991 | Batson ..................................... 345/155 |
| 5,081,450 | 1/1992 | Lucas et al. . |
| 5,170,152 | 12/1992 | Taylor ..................................... 345/155 |
| 5,202,756 | 4/1993 | Sasaki et al. . |
| 5,402,513 | 3/1995 | Schafer .................................... 382/47 |
| 5,469,190 | 11/1995 | Masterson . |
| 5,506,621 | 4/1996 | Ogasawara et al. . |
| 5,625,379 | 4/1997 | Reinert et al. . |

FOREIGN PATENT DOCUMENTS

| | | |
|---|---|---|
| 0 445 388 A2 | 9/1991 | European Pat. Off. ......... H04N 9/64 |
| 0 617 554 A1 | 9/1994 | European Pat. Off. . |
| 2 207 029 | 1/1989 | United Kingdom ............ G06F 15/66 |

OTHER PUBLICATIONS

Till, John. "Modem Manager Monitors a Variety of Devices." Electonic Design. vol. 36, No. 13, Jun. 22, 1989. Cleveland, Ohio. pp. 123–124.

Primary Examiner—Vijay Shankar
Attorney, Agent, or Firm—Roger W. Blakely, Jr.; Steven A. Shaw

[57] ABSTRACT

A method and apparatus for determining representative values for the chrominance components to be associated with a plurality of luminance components in a horizontally shrunken or stretched image for graphics controllers wherein display image data is stored in a buffer memory in a form associating a single set of U and V chrominance components with a plurality of Y luminance values. For a four to one shrinkage of an image in a format associating one set of chrominance components with four pixel luminance values wherein each pixel luminance value in the shrunken image initially has as associated set of chrominance components $U_0$, $U_1$, $U_2$ and $U_3$ and $V_0$, $V_1$, $V_2$ and $V_3$, the multiple values of the chrominance components are sequentially accumulated in a ¾:¼ ratio in such a manner as to provide an approximate average value for U and V for each set of four pixel luminance values in the shrunken image. Circuitry for processing the chrominance components making use of interpolation circuitry already used for interpolation between pixels for a stretched image is disclosed.

15 Claims, 4 Drawing Sheets

ACCUPAC FORMAT

METHOD AND APPARATUS FOR DETERMINING REPRESENTATIVE CHROMINANCE COMPONENTS

This application is a continuation of Ser. No. 08/550,794 filed Oct. 31, 1995, now abandoned.

BACKGROUND OF THE INVENTION

1. Field of the Invention

The present invention relates to the field of graphics controllers, and more particularly to graphics controllers having the capability of replicating pixels and of interpolating between pixels.

2. Prior Art

Certain prior art graphics controllers manufactured by Cirrus Logic, Inc., assignee of the present invention, have used a graphics data format referred to as AccuPak®. As may be seen in FIG. 1, in this format, pixel data is stored 4 pixels for every 32-bit word for display purposes as the 32-bit words are read out in sequence. Thus, data must be stored in the AccuPak® format for display purposes, even though this format does not directly lend itself to replicating pixels, and particularly to interpolating between pixels. Accordingly, when manipulating image data to stretch or shrink a video image in one or both directions, the video data in AccuPak® is first converted to YUV-444 format, the replication or interpolation required is then carried out on the YUV-444 data, and then the same is reconverted to the AccuPak® format.

As may be seen in FIG. 1, each 32-bit word of video data consists of four 5-bit components, such as $Y_0$ through $Y_3$, each representing in 5 bits the luminance value of the corresponding pixel of the respective four pixels $0$ through $3$. $U_0$ and $V_0$, on the other hand, are each 6-bit components of the 32-bit word and comprise the two chrominance components which will be used for all four pixel luminance values of the 32-bit word. Thus, in the AccuPak® format, luminance values are represented by a 5-bit component and can vary pixel to pixel, whereas the chrominance values are 6-bit components, and are fixed for each group of four pixels. The four pixels, of course, are four successive pixels in a raster scan image. The ability to use the same chrominance information for four successive pixels is due to the fact that the human eye is less sensitive to chrominance information, a fact utilized also in ordinary TV broadcasts, wherein the in-phase and quadrature chrominance signals on the chroma subcarrier have a substantially lower bandwidth than the luminance signal.

The conversion from AccuPak® to YUV, and more particularly YUV-444, is very simple, as illustrated in FIG. 2. In particular, for each of four pixel luminance values such as $Y_0$ through $Y_3$, the respective two values of chrominance $U_0$ and $V_0$ are directly associated, so that now each pixel is represented by a luminance value followed by its two chrominance values, even though the two chrominance values remain constant for four successive pixels. Also in this conversion, the 5 and 6-bit components are expressed in 8-bit byte form by padding the unoccupied bits with zeros.

In the prior art graphics controllers being described, circuitry was provided to reformat image data to stretch the image in either direction by a factor of 2, 4 or 8. This stretching, of course, is on a pixel to pixel basis. In a specific example, assume that an image is to be stretched 10% in the horizontal direction. Here, it is desired to convert the pixel data for ten successive pixels to pixel data for eleven successive pixels. This is done in the prior art graphics controller by interpolating between two adjacent pixels in the series of ten pixels, so that pixel data for an 11th pixel is provided. This provides a smoother transition than merely replicating one of the pixels, as replication, particularly as the stretching gets larger, gives the image a grainy appearance.

In the following table, Table 1, the manner in which such horizontal interpolation is carried out in the prior art may be seen.

TABLE 1

| 1-to-1 stretch | 2-to-1 stretch | 4-to-1 stretch | 8-to-1 stretch |
|---|---|---|---|
| $Y_0, U_0, V_0$ | $Y_0, U_0, V_0$ | $Y_0, U_0, V_0$ | $Y_0, U_0, V_0$ |
| $Y_1, U_0, V_0$ | $\frac{Y_0+Y_1}{2}, U_0, V_0$ | $\frac{3Y_0+Y_1}{4}, U_0, V_0$ | $Y_0, U_0, V_0$ |
| $Y_2, U_0, V_0$ | $Y_1, U_0, V_0$ | $\frac{Y_0+Y_1}{2}, U_0, V_0$ | $\frac{3Y_0+Y_1}{4}, U_0, V_0$ |
| $Y_3, U_0, V_0$ | $\frac{Y_1+Y_2}{2}, U_0, V_0$ | $\frac{Y_0+3Y_1}{4}, U_0, V_0$ | $\frac{3Y_0+Y_1}{4}, U_0, V_0$ |
| $Y_4, U_1, V_1$ | $Y_2, U_0, V_0$ | $Y_1, U_0, V_0$ | $\frac{Y_0+Y_1}{2}, U_0, V_0$ |
| $Y_5, U_1, V_1$ | $\frac{Y_2+Y_3}{2}, U_0, V_0$ | $\frac{3Y_1+Y_2}{4}, U_0, V_0$ | $\frac{Y_0+Y_1}{2}, U_0, V_0$ |
| ... | $Y_3, U_0, V_0$ | $\frac{Y_1+Y_2}{2}, U_0, V_0$ | $\frac{Y_0+3Y_1}{4}, U_0, V_0$ |
| | $\frac{Y_3+Y_4}{2}, U_0, V_0$ | $\frac{Y_1+3Y_2}{4}, U_0, V_0$ | $\frac{Y_0+3Y_1}{4}, U_0, V_0$ |
| | $Y_4, U_1, V_1$ | $Y_2, U_0, V_0$ | $Y_1, U_0, V_0$ |
| | $\frac{Y_4+Y_5}{2}, U_1, V_1$ | $\frac{3Y_2+Y_3}{4}, U_0, V_0$ | $Y_1, U_0, V_0$ |
| | $Y_5, U_1, V_1$ | $\frac{Y_2+Y_3}{2}, U_0, V_0$ | $\frac{3Y_1+Y_2}{4}, U_0, V_0$ |
| | ... | $\frac{Y_2+3Y_3}{4}, U_0, V_0$ | $\frac{3Y_1+Y_2}{4}, U_0, V_0$ |
| | | $Y_3, U_0, V_0$ | $\frac{Y_1+Y_2}{2}, U_0, V_0$ |
| | | $\frac{3Y_3+Y_4}{4}, U_0, V_0$ | $\frac{Y_1+Y_2}{2}, U_0, V_0$ |
| | | $\frac{Y_3+Y_4}{2}, U_0, V_0$ | $\frac{Y_1+3Y_2}{4}, U_0, V_0$ |
| | | $\frac{Y_3+3Y_4}{4}, U_0, V_0$ | $\frac{Y_1+3Y_2}{4}, U_0, V_0$ |
| | | $Y_4, U_1, V_1$ | $Y_2, U_0, V_0$ |

TABLE 1-continued

| 1-to-1 stretch | 2-to-1 stretch | 4-to-1 stretch | 8-to-1 stretch |
|---|---|---|---|
| | | $\dfrac{3Y_4 + Y_5}{4}, U_1, V_1$ | $Y_2, U_0, V_0$ |
| | | ... | $\dfrac{3Y_2 + Y_3}{4}, U_0, V_0$ |
| | | | $\dfrac{3Y_2 + Y_3}{4}, U_0, V_0$ |

With no stretching (1–to–1), of course, the YUV-444 data is merely the YUV data for each successive pixel, as shown. For a 2–to–1 stretch, an interpolation is made so that data for an additional pixel is determined and effectively interposed between the data for adjacent pixels in the 1–to–1 version of the image data. This is done by taking the average of the luminance values of the two successive pixels ($\frac{1}{2}Y_0+\frac{1}{2}Y_1$). In the example of the Figure, $U_0$ and $V_0$ are already applicable to both $Y_0$ and $Y_1$ and, accordingly represent "an average" for these two pixels already. Obviously, when interpolating between the fourth and fifth pixels, $U_0$ and $U_1$ could be averaged, as could $V_0$ and $V_1$, though this was not done because of the extra hardware required for minimal gain in visual appearance of the display.

For a 4–to–1 stretch, pixel data for three additional pixels are calculated and effectively interposed between each two pixels in the 1–to–1 image representation. These additional three pixels are also interpolations between two adjacent pixels in the 1–to–1 image data, calculated by a ¾:¼ weighting, a ½:½ weighting, and a ¼:¾ weighting, respectively in both the luminance and the two chrominance components. Again, $U_0$ and $V_0$ actually represent that weighting, as $U_0$ and $V_0$ are applicable to both pixel 0 and 1 in Table 1. As to interpolating between $Y_3$ and $Y_4$, the U and V values associated with one luminance value were used, not an interpolation between the two sets of values, as repacking the AccuPak® requires the same U and V values for four successive pixels. Finally, the 8–to–1 stretch is accomplished by merely replicating each pixel obtained from a 4–to–1 stretch.

The net effect of the foregoing is that circuitry for interpolating two adjacent values of Y, U and V by a ¾:¼, ½:½, and a ¼:¾ weighting already exists in the prior art products.

In the case of shrinking an image dimension, however, the problem is somewhat different. For instance, assume that an image dimension is to be shrunk to one-fourth of its original size. This may be readily done by merely picking each fourth pixel of the 1–to–1 image for display, such as is shown in Table 2.

TABLE 2

4-to-1 shrink $Y_3, U_0, V_0$
$Y_7, U_1, V_1$
$Y_{11}, U_2, V_2$
$Y_{15}, U_3, V_3$
$Y_{19}, U_4, V_4$
$Y_{23}, U_5, V_5$
$Y_{27}, U_6, V_6$
$Y_{31}, U_7, V_7$ Note, however, that in the 4–to–1 shrink, each successive pixel for display is taken from a different 32-bit image data word, and from its prior AccuPak® format, has its own unique value of U and V associated with it. Consequently, when converting from YUV-444 back to AccuPak®, a value for U and V must be selected as representative for four successive pixels, such as $Y_3$, $Y_7$, $Y_{11}$ and $Y_{15}$ in the example shown. In the prior art devices, an arbitrary choice was made to always use one of the four sets of values for U and V to avoid the necessity of having to calculate anything different. Note, however, that such a choice in essence is associating a single set of values $U_n$ and $V_n$ to the equivalent of sixteen successive pixels of the original 1–to–1 image data. This has the effect of some image distortion and loss of image features that may have been brought out by the chrominance values there between.

Interpolation or shrinking in the vertical direction does not present the same problems, in that since each four successive (horizontal) pixels have the same values of U and V, interpolation of U and V in the vertical direction or skipping of entire lines will yield the same new values of U and V for each four successive horizontal pixels in the line or lines added by interpolation between two lines of the 1–to–1 image, or used in the shrunken image. In essence, an AccuPak® or AccuPak®-like formatting accommodates different values of U and V between all vertically adjacent pixels, but not horizontally adjacent pixels. In general, in the prior art, image size adjustment was done first in the vertical direction, then in the horizontal direction.

BRIEF SUMMARY OF THE INVENTION

A method and apparatus for determining representative values for the chrominance components to be associated with a plurality of luminance components in a horizontally shrunken image for graphics controllers wherein display image data is stored in a buffer memory in a form associating a single set of U and V chrominance components with a plurality of Y luminance values are disclosed. For a four to one shrinkage of an image in a format associating one set of chrominance components with four pixel luminance values wherein each pixel luminance value in the shrunken image initially has as associated set of chrominance components $U_0$, $U_1$, $U_2$ and $U_3$ and $V_0$, $V_1$, $V_2$ and $V_3$, the multiple values of the chrominance components are sequentially accumulated in a ¾:¼ ratio in such a manner as to provide an approximate average value for U and V for each set of four pixel luminance values in the shrunken image. Circuitry for processing the chrominance components making use of interpolation circuitry already used for interpolation between pixels for a stretched image is disclosed.

DETAILED DESCRIPTION OF THE INVENTION

In accordance with the present invention, visual characteristics of a shrunken image are enhanced by calculating average or near average values of U and V for each successive group of four pixels in that shrunken image for repacking in AccuPak® format or an AccuPak®-like format. In particular, consider the 4–to–1 shrinkage of an image originally formatted in AccuPak® format, wherein four successive pixels in the raster scan image have initially associated with them a single set- of U and V values. The general form of YUV-444 data when expanded from AccuPak® format is shown in Table 2. Here, the problem consists of how to reformat the YUV-444 data into an AccuPak® or AccuPak®-like format with minimum loss of information in the chrominance values. To achieve this result, ideally the four sets of U and V values for four pixels would be averaged prior to reformatting the four pixels into the 32-bit AccuPak® format. Thus, using Table 2 of the prior art for reference, one would like to have the AccuPak® data for a 4–to–1 shrink in the form shown in Table 3 below.

TABLE 3

Accupak ®
4-to-1 shrink $$Y_3, Y_7, Y_{11}, Y_{15}, \frac{U_0 + U_1 + U_2 + U_3}{4}, \frac{V_0 + V_1 + V_2 + V_3}{4}$$

$$Y_{19}, Y_{23}, Y_{27}, Y_{31}, \frac{U_4 + U_5 + U_6 + U_7}{4}, \frac{V_4 + V_5 + V_6 + V_7}{4}$$

$$Y_{35}, Y_{39}, Y_{43}, Y_{47}, \frac{U_8 + U_9 + U_{10} + U_{11}}{4}, \frac{V_8 + V_9 + V_{10} + V_{11}}{4}$$

. . .

Such a form gives equal weighting to the U and V chrominance values for each of the four pixels represented by the 32-bit AccuPak® word. While averaging the U and V values as shown is certainly possible, the same has the disadvantage that such an averaging would require additional hardware (circuitry) on the graphics controller, increasing the cost of the same more than is desirable.

As an alternative to the averaging of the U and V values as in Table 3, the present invention contemplates the approximation of such averaging through the use of the X interpolator used in the prior art graphics controllers, though with some modification thereto.

Figure 1:
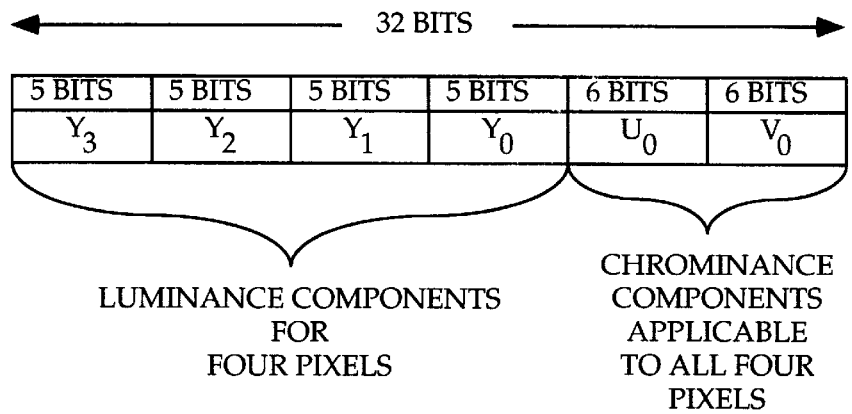
FIG. 1 illustrates a specific prior art graphics data format referred to a AccuPak®, in which pixel data is stored 4 pixels for eve 32-bit word.
Figure 2:
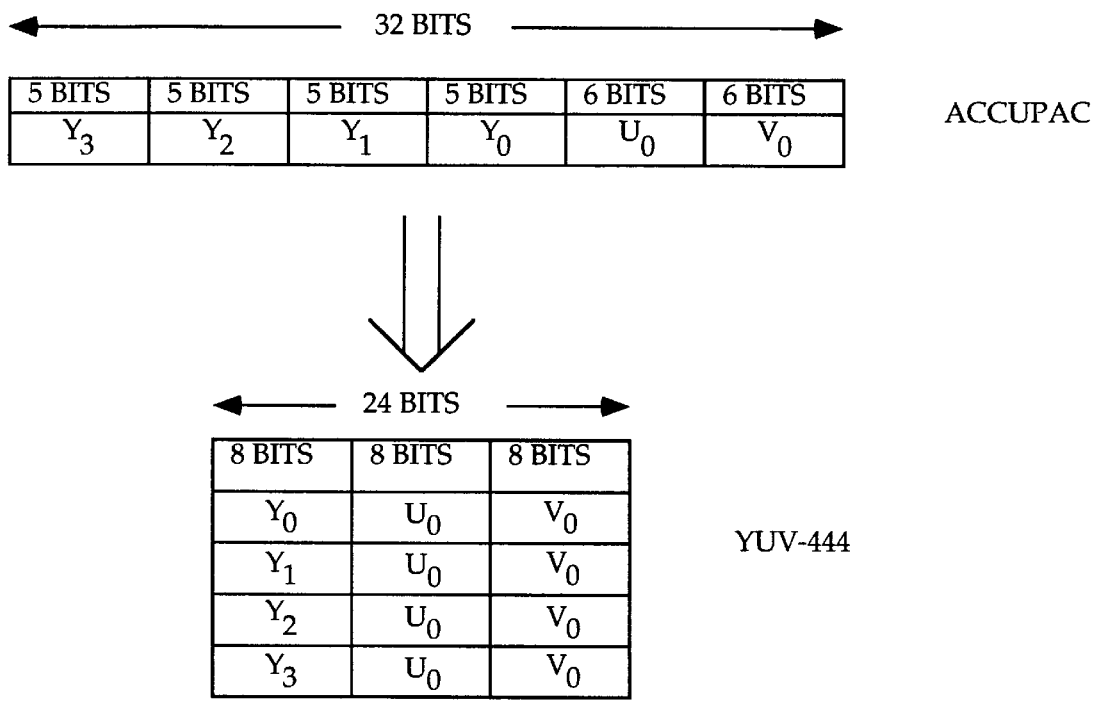
FIG. 2 illustrates the conversion from AccuPak® to YUV-444.
Figure 3:
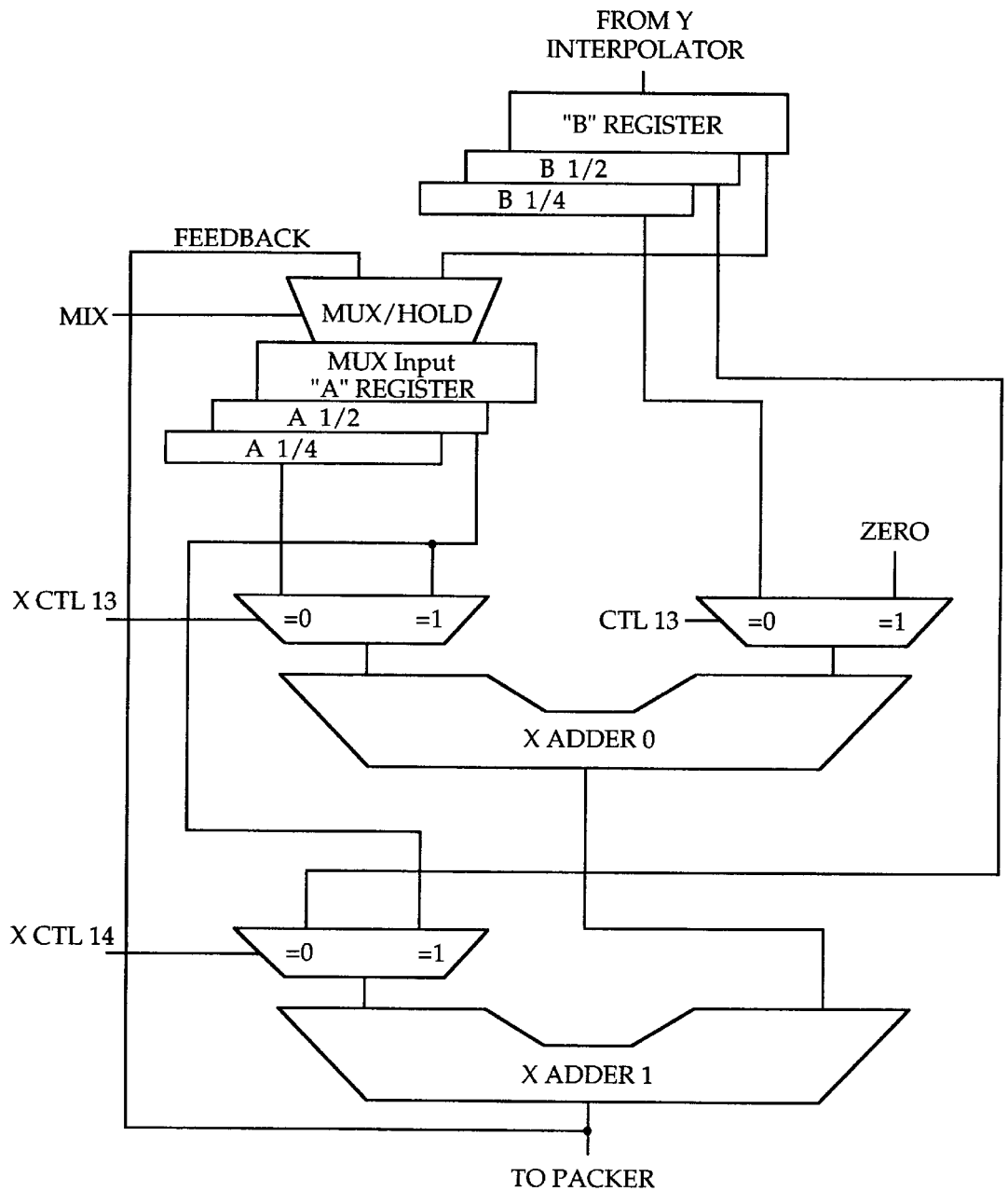
FIG. 3 illustrates an x-interpolator modified in accordance with the present invention.
Figure 4:
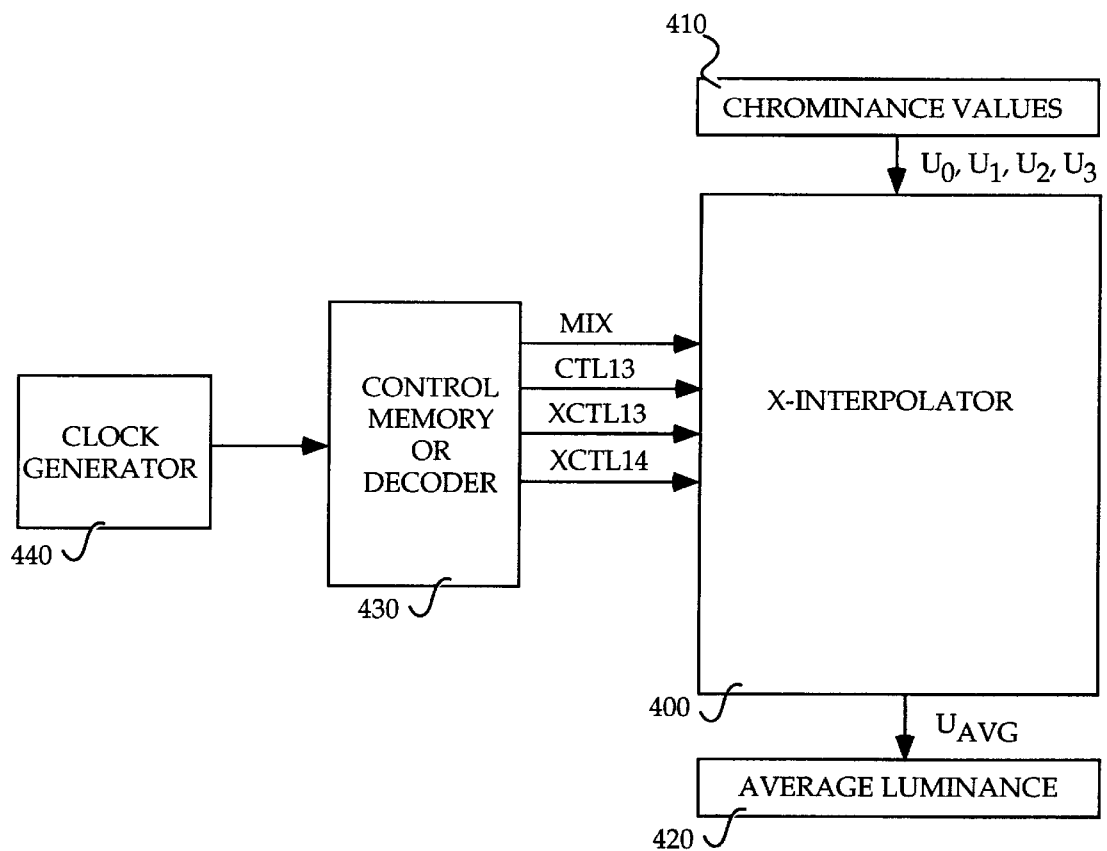
FIG. 4 is a block diagram illustrating an x-interpolator of the present invention which calculates an average luminance.

Referring now to FIG. 3, an X or horizontal interpolator modified in accordance with the present invention may be seen. The interpolator includes an A register and a B register, each of which may present the contents thereof less the least significant bit (A½, B½) and less the two least significant bits (A¼, B¼) as their output. Dropping the least significant bit is equivalent to dividing the register contents in half, and dropping the two least significant bits is equivalent to dividing the register contents by four. The divided-by-four contents of registers A and B may be passed through multiplexers controlled by control signals XCTL 13 and CTL 13 to X ADDER 0, with the output ¼A+¼B providing one input to the X ADDER 1. The other input to X ADDER 1 is provided by a MUX controlled by X CTL 14, which may pass either ½A or ½B as the second input to X ADDER 1. Accordingly, depending upon the control signal X CTL 14, the output of X ADDER 1 under these conditions is either ¾A+¼B or ¼A+¾B.

Alternatively, the control signals X CTL 13 and CTL 13 may be used to control the respective MUX's to pass ½A as one input to X ADDER 0, and 0 as the other input to the adder X ADDER 0. Consequently, the output of X ADDER 0 in this condition, provided as one input to X ADDER 1, will be ½A. The other input to X ADDER 1 is controlled by the control signal XCTL 14 to be either ½A or ½B, whereby the output of X ADDER 1 may be selected to be either A or ½A+½B.

The interpolator of FIG. 3 also includes a multiplexer/holding register identified as MUX/HOLD in the Figure. The multiplexer/holding register is controlled by the control signal MIX, and has as one input thereto, feedback from the output of the adder X ADDER 1. Finally, there is a direct path from the B register to the second input of the multiplexer/holding register MUX/Hold.

The circuit of FIG. 3 is used as an X interpolator during the horizontal stretching of an image in a manner well-known in prior art graphics controllers. This current technique won't correctly match up the chrominance when pixels having different U, V values are combined. In accordance with the present invention, the circuit of FIG. 3 is used in a novel manner to calculate approximate average values for U and V to use for multiple pixels when the same multiple pixels have more than one set of U and V values associated therewith. As an example, consider the approximate averaging of the U chrominance components for four successive pixels of a 4–to–1 shrunken image prior to reformatting in the AccuPak® format. Since the pixel data for the 1–to–1 image was originally in AccuPak® form, every fourth pixel in the YUV-444 format as expanded from the AccuPak® format has its own set of U and V values associated therewith.

Figure 5:
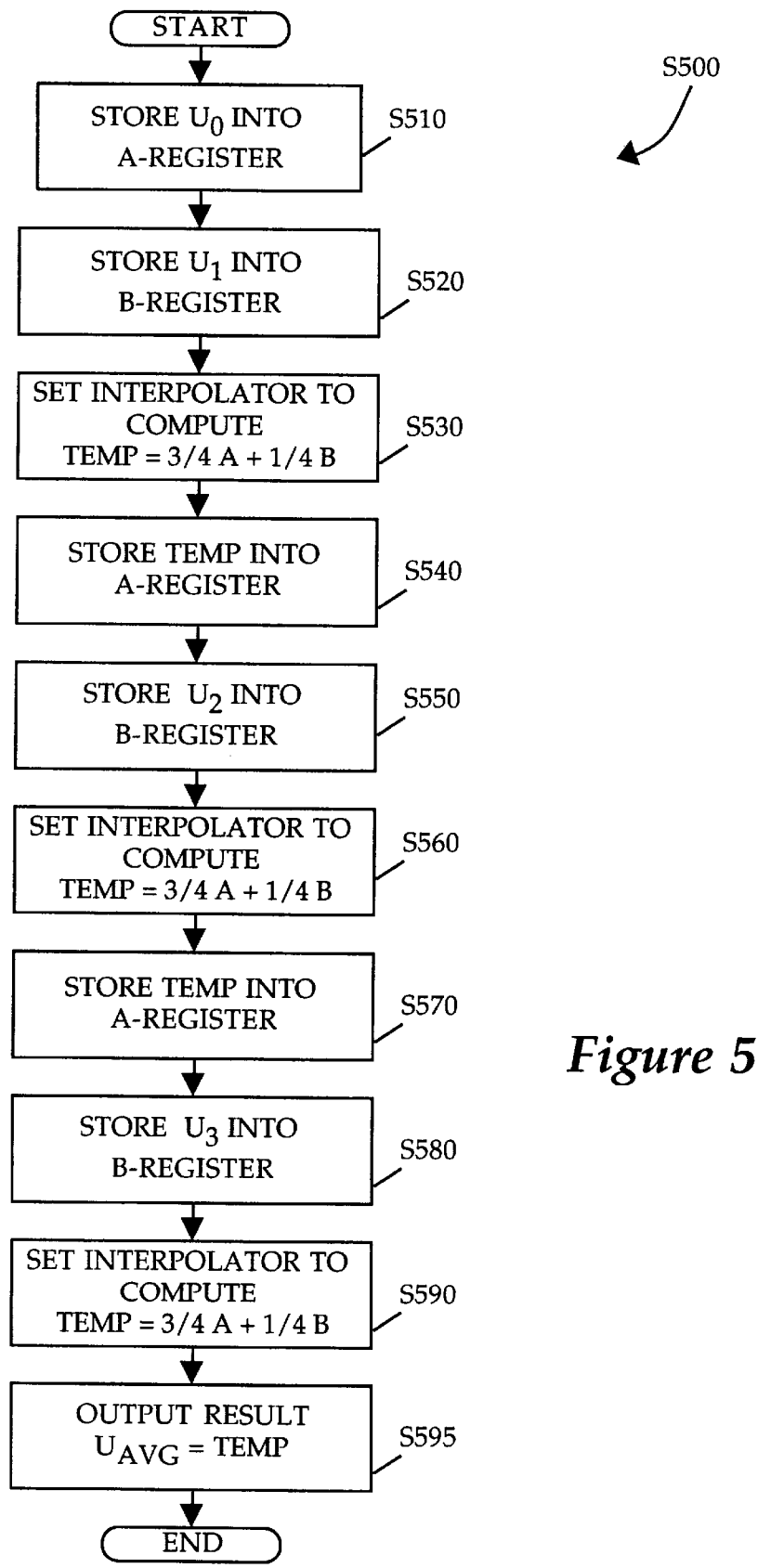
FIG. 5 illustrates the steps to calculate an average luminance.

The steps to calculate the approximate average can be seen in FIG. 5. The interpolator of FIG. 3 is set to calculate ¾A+¼B, as illustrated in FIG. 5. Initially, the first value of $U_0$ is provided to the B register, and from there via the multiplexer MUX/Hold to the A register. Then the second value, $U_1$, is provided to the B register. Since the circuit is set to provide ¾A+¼B as the output of the adder X ADDER 1, the output of X ADDER 1 for the $U_0$ input to the A register and the $U_1$ input to the B register will be ¾$U_0$ +¼$U_1$. The feedback path couples that output to the A register via the MUX/Hold multiplexer to the input of the A register while $U_2$ is input to the B register. These two inputs are then processed again in the ¾A+¼B proportion, resulting in the output of the adder X ADDER 1 of ¾(¾$U_0$+¼$U_1$)+¼$U_2$= %16$U_0$+³⁄16$U_1$+¼$U_2$. The feedback and reprocessing is continued one more time as the fourth value $U_3$ is provided to the B register, again with the ¾A+¼B proportion, to result in the approximate average U output from the adder X ADDER 1 of ¾(⁹⁄16$U_0$+³⁄16$U_1$+¼$U_2$)+¼$U_3$, or:

$$U_{avg} \approx {}^{27}\!/_{64} U_0 + {}^{9}\!/_{64} U_1 + {}^{12}\!/_{64} U_2 + {}^{16}\!/_{64} U_3$$

While the foregoing approximation is most heavily weighted toward the value of $U_0$ and least heavily weighted toward the value of $U_1$, clearly all values of U have a significant contribution to the approximation. Further, the relative weighting in this approximation, particularly with the most heavily weighted and least weighted values of the chrominance components being adjacent to each other, provides a very substantial advantage over merely selecting one of the values $U_0$ through $U_3$ as the only value considered. Further, the extent of complication added to the interpolator already in the graphics controller to achieve the approximation is minimal, yet image features which in the prior art may be lost in the unconsidered chrominance values, are substantially preserved in the compressed image using the approximation of the U and V values of the present invention. In that regard, obviously the V values may be processed the same as the U values to provide the same form of approximation:

$$V_{avg} \approx {}^{27}\!/_{64}V_0 + {}^{9}\!/_{64}V_1 + {}^{12}\!/_{64}V_2 + {}^{16}\!/_{64}V_3$$

Finally, with respect to a 2–to–1 compression, rather than a 4–to–1 compression of the image, if the same approximation is used, the corresponding values of U and V processed will provide an approximate average value for U of ${}^{27}\!/_{64}U_0 + {}^{9}\!/_{64}U_0 + {}^{12}\!/_{64}U_1 + {}^{16}\!/_{64}U_1 = 9/16\ U_0 + {}^{7}\!/_{16}U_1$, quite a good average.

Pixel stretching in a horizontal direction has the same properties as when a shrink operation occurs. Consider the consequence of a 2 to 1 stretch operation where combinations of pixels with different chrominance values are recombined. From the example of the stretch operation in Table 1, when the "2–to–1 stretch" operation is recombined into 32 bit AccuPak® format, the first 32 bits have matching U and V values for all the Y values. In the second set of four pixels, there is a combination of $Y_3$ and Y4. This mixes the chrominance values with different luminance values. To more accurately reflect the resultant image, the existing interpolation unit is set to ¾ first pixel+¼ second pixel as is accomplished in a shrink operation. This operation has the effect of blending the color changes more uniformly and is more pleasing to the eye.

For purposes of illustration, consider the two image data words in AccuPak® format:

$Y_0\ Y_1\ Y_2\ Y_3\ U_0\ V_0$ $Y_4\ Y_5\ Y_6\ Y_7\ U_1\ V_1$

For the first four pixels in the 2 to 1 stretch:

| $\dfrac{Y_1 + Y_2}{2}$ | $Y_1$ | $\dfrac{Y_0 + Y_1}{2}$ | $Y_0$ | $U_0$ | $V_0$ |
|---|---|---|---|---|---|

For the second four pixels

| $\dfrac{Y_3 + Y_4}{2}$ | $Y_3$ | $\dfrac{Y_2 + Y_3}{2}$ | $Y_2$ | See below ¾$U_0$ + ¼$U_1$ | See below ¾$V_0$ + ¼$V_1$ |
|---|---|---|---|---|---|

As the four pixels are processed into the AccuPak® format, the following formulas apply:

$$¾(¾(¾U_0+¼V_0)+¼U_0)+¼U_1$$

$$¾(¾(¾V_0+¼V_0)+¼V_0)+¼V_1$$

These reduce to ${}^{27}\!/_{64}\ U_0 + {}^{9}\!/_{64}U_0 + {}^{12}\!/_{64}U_0 + {}^{16}\!/_{64}U_1$ or ¾ $U_0$+¼ $U_1$, and ${}^{27}\!/_{64}\ V_0 + {}^{9}\!/_{64}\ V_0 + {}^{12}\!/_{64}V_0 + {}^{16}\!/_{64}\ V_1$ or ¾ $V_0$+¼ $V_1$.

This algorithm works for all stretch operations, and the ¾$U_n$¼ $U_{n+1}$ and ¾ $V_n$¼ $V_{n+1}$ would be used for averaging between pixels which traverse packet boundaries. It should be noted that stretch and shrink values can be non-integer quantities (e.g. 3.06) for this invention.

In the foregoing approximation, the interpolator processed the values in a fixed ¾ A+¼ B format. If desired, the weighting of the chrominance components and the feedback of the sum could be altered to perhaps provide an even superior approximation. However, the prior art interpolator does not include the capability of altering the weighting during the processing, and the approximation attained without adding such additional control is adequate for the purposes intended without complicating the control circuitry for this purpose.

What is claimed is:

1. In a graphics controller wherein each word of graphics data for a first image includes a plurality of individual pixel luminance values (Y) and a single set of chrominance values (U,V) applicable to each of the plurality of individual pixel luminance values of that word, an improved method of generating words of graphics data for a second image to be displayed corresponding to but of a different size than the first image and wherein individual pixel luminance values for a word of graphics data for the second image can be taken from at least two different words of graphics data for the first image having different chrominance values, comprising the step of determining, for each word of graphics data for the second image taken from at least two different words of graphics data for the first image, a set of chrominance values approximating the average of the chrominance values for the plurality of individual pixel luminance values in the respective word of graphics data for the second images on a recursive equation of a form $S_n=aS_{n-1}+bx_n$ wherein a and b are first and second factors, $S_{n-1}$ is a previous value of the average, $S_n$ is a current value of the average and $x_n$ is an nth value of the set of chrominance values.

2. The method of claim 1 wherein each word of graphics data for the first image and for the second image comprises four luminance values (Y) and one set of chrominance values (U,V).

3. The method of either one of claim 1 or claim 2 wherein the set of chrominance values (U,V) approximating the average of the chrominance values for the plurality of individual pixel luminance values in the respective word of graphics data for the second image is determined from the graphics data for the first image by the equations:

$$U = {}^{27}\!/_{64}U_0 + {}^{9}\!/_{64}U_1 + {}^{12}\!/_{64}U_2 + {}^{16}\!/_{64}U_3$$

$$V = {}^{27}\!/_{64}V_0 + {}^{9}\!/_{64}V_1 + {}^{12}\!/_{64}V_2 + {}^{16}\!/_{64}V_3$$

where $U_0$ and $V_0$, $U_1$ and $V_1$, $U_2$ and $V_2$ and $U_3$ and $V_3$ are the sets of chrominance values for the luminance values $Y_0$, $Y_1$, $Y_2$ and $Y_3$, respectively, of the graphics data for the first image.

4. The method of claim 3 wherein, for at least some of the words of graphics data for the second image, the luminance values $Y_0$, $Y_1$, $Y_2$ and $Y_3$ are each taken from a different word of graphics data for the first image.

5. The method of claim 3 wherein, for at least some of the words of graphics data for the second image, the luminance values $Y_0$ and $Y_1$ are taken from one word of graphics data for the first image and $Y_2$ and $Y_3$ are each taken from a different word of graphics data for the first image.

6. The method of claim 3 wherein, for at least some of the words of graphics data for the second image, three of the four luminance values $Y_0$, $Y_1$, $Y_2$ and $Y_3$ are taken from one word of graphics data for the first image and one luminance value is taken from a different word of graphics data for the first image.

7. The method of claim 2 wherein the set of chrominance values (U,V) approximating the average of the chrominance values for the plurality of individual pixel luminance values in the respective word of graphics data for the second image is determined by finding for U, a first sum ¾$U_0$+¼$U_1$, then finding a second sum of ¾of the first sum+¼$U_2$, and then finding a third sum of ¾of the second sum+¼$U_3$, and for V, finding a first sum ¾$V_0$+¼$V_1$, then finding a second sum of ¾of the first sum+¼$V_2$, and then finding a third sum of ¾of the second sum+¼$V_3$, where $U_0$ and $V_0$, $U_1$ and $V_1$, $U_2$ and $V_2$ and $U_3$ and $V_3$ are the sets of chrominance values for the luminance values $Y_0$, $Y_1$, $Y_2$ and $Y_3$, respectively, of the graphics data for the first image.

8. The method of claim 3 wherein, for at least some of the words of graphics data for the second image, the luminance values $Y_0$, $Y_1$, $Y_2$ and $Y_3$ are each taken from a different word of graphics data for the first image.

9. The method of claim 3 wherein, for at least some of the words of graphics data for the second image, the luminance values $Y_0$ and $Y_1$ are taken from one word of graphics data for the first image and $Y_2$ and $Y_3$ are each taken from a different word of graphics data for the first image.

10. The method of claim 3 wherein, for at least some of the words of graphics data for the second image, three of the four luminance values $Y_0$, $Y_1$, $Y_2$ and $Y_3$ are taken from one word of graphics data for the first image and one luminance value is taken from a different word of graphics data for the first image.

11. A graphics controller wherein each word of graphics data for a first image includes a plurality of individual pixel luminance values (Y) and a single set of chrominance values (U,V) applicable to each of the plurality of individual pixel luminance values of that word for generating words of graphics data for a second image to be displayed corresponding to but of a different size than the first image and wherein individual pixel luminance values for a word of graphics data for the second image can be taken from at least two different words of graphics data for the first image having different chrominance values, the graphics controller including circuitry for determining, for each word of graphics data for the second image taken from at least two different words of graphics data for the first image, a set of chrominance values approximating the average of the chrominance values for the plurality of individual pixel luminance values in the respective word of graphics data for the second image, based on a recursive equation of a form $S_n = aS_{n-1} + bx_n$ wherein a and b are first and second factors, $S_{n-1}$ is a previous value of the average. $S_n$ is a current value of the average and $x_n$ is an nth value of the set of chrominance values.

12. The graphics controller of claim 11 wherein each word of graphics data for the first image and for the second image comprises four luminance values (Y) and one set of chrominance values (U,V).

13. The graphics controller of claim 12 wherein the circuitry for determining the set of chrominance values (U,V) approximating the average of the chrominance values for the plurality of individual pixel luminance values in the respective word of graphics data for the second image comprises circuitry for finding for U, a first sum ¾$U_0$+¼$U_1$, then finding a second sum of ¾ of the first sum+¼$U_2$, and then finding a third sum of ¾ of the second sum+¼$U_3$ by recycling each prior sum with a new value of U through the same adder with a ¾:¼ weighting, and for V, finding a first sum ¾$V_0$+¼$V_1$, then finding a second sum of ¾ of the first sum+¼$V_2$, and then finding a third sum of ¾ of the second sum+¼$V_3$ by recycling each prior sum with a new value of U through the same adder with a ¾:¼ weighting, where $U_0$ and $V_0$, $U_1$ and $V_1$, $U_2$ and $V_2$ and $U_3$ and $V_3$ are the sets of chrominance values for the luminance values $Y_0$, $Y_1$, $Y_2$ and $Y_3$, respectively, of the graphics data for the first image.

14. The method of claim 1 wherein a=¾ and b=¼.

15. The graphics controller of claim 11 wherein a=¾ and b=¼.

* * * * *